(12) United States Patent
Tsutsui

(10) Patent No.: US 8,290,706 B2
(45) Date of Patent: Oct. 16, 2012

(54) MAP DATA DISPLAY CONTROL APPARATUS, MAP DATA DISPLAY CONTROL METHOD, AND PROGRAM FOR THE SAME

(75) Inventor: Masanao Tsutsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 500 days.

(21) Appl. No.: 12/628,368

(22) Filed: Dec. 1, 2009

(65) Prior Publication Data

US 2010/0169012 A1 Jul. 1, 2010

(30) Foreign Application Priority Data

Dec. 25, 2008 (JP) ................................. 2008-330544

(51) Int. Cl.
*G01C 21/32* (2006.01)
(52) U.S. Cl. ..................... 701/455; 340/995.17; 701/457
(58) Field of Classification Search .................... 701/212
See application file for complete search history.

(56) References Cited

U.S. PATENT DOCUMENTS

| | | | | |
|---|---|---|---|---|
| 2,908,902 | A * | 10/1959 | Gray et al. | 701/495 |
| 4,873,513 | A * | 10/1989 | Soults et al. | 345/27 |
| 6,067,502 | A * | 5/2000 | Hayashida et al. | 701/428 |
| 6,335,695 | B1 * | 1/2002 | Kawasaki | 340/995.14 |
| 2003/0146985 | A1 * | 8/2003 | Miyagi et al. | 348/231.3 |
| 2004/0176908 | A1 * | 9/2004 | Senda et al. | 701/211 |
| 2006/0271280 | A1 * | 11/2006 | O'Clair | 701/208 |
| 2008/0183377 | A1 * | 7/2008 | O'Clair | 701/200 |
| 2009/0109216 | A1 * | 4/2009 | Uetabira | 345/419 |

FOREIGN PATENT DOCUMENTS

| | | |
|---|---|---|
| JP | 3-10279 | 1/1991 |
| JP | 4-319984 | 11/1992 |
| JP | 2001-34161 | 2/2001 |
| JP | 2002-351307 | 12/2002 |
| JP | 2003-84665 | 3/2003 |
| JP | 2004-361454 | 12/2004 |

OTHER PUBLICATIONS

Office Action issued Apr. 19, 2011, in Japanese Patent Application No. 2008-330544.

* cited by examiner

*Primary Examiner* — Shelley Chen
(74) *Attorney, Agent, or Firm* — Oblon, Spivak, McClelland, Maier & Neustadt, L.L.P.

(57) ABSTRACT

A map data display control apparatus includes: a position information acquiring section acquiring position information; a latitude determining section determining whether a latitude identified by the acquired position information is in the excess of a predetermined latitude threshold or not; a display range calculating section calculating a display range for displaying a map with reference to a position identified by the acquired position information based on the result of the determination made by the latitude determining section; and a rendering section rendering a map associated with the reference position based on the calculated display range.

10 Claims, 9 Drawing Sheets

750

760

MAP DATA DISPLAY CONTROL APPARATUS, MAP DATA DISPLAY CONTROL METHOD, AND PROGRAM FOR THE SAME

BACKGROUND OF THE INVENTION

1. Field of the Invention

The present invention relates to a map data display control apparatus and, more particularly, to a map data display control apparatus and a map data display control method for displaying a map and a program for executing the method on a computer.

2. Description of the Related Art

According to the related art, map data display control apparatus are available to display maps of various locations using map data stored in map database and the like. For example, proposals have been made to suggest car navigation apparatus which can display a moving map utilizing a vector map based on the position of a moving vehicle.

For example, proposals have been made to suggest a map rendering method for automobile navigation which allows a map represented using longitudes and latitudes to be converted into a planimetric map showing actual distances and which allows the plane map to be scrolled as the vehicle of interest moves (for example, see FIG. 1 in JP-A-03-10279 (Patent Document 1)).

SUMMARY OF THE INVENTION

According to the above-mentioned technique in the related art, a map of an area having a predetermined longitudinal width and a predetermined latitudinal width is normalized in the longitudinal direction into a planimetric trapezoidal map using the current position of a vehicle, and the planimetric trapezoidal map obtained by the conversion is rendered. When maps are displayed using, for example, vector maps, a map included in a display range must be modified using a cosine function into a map based on actual distances, the modification being carried out based on the longitude and latitude of a reference position in the display range.

For example, let us assume that a map of an area near 90° N latitude or 90° S latitude is to be displayed using vector map representation. In this case, for example, when the reference position of the display range is at 90° N latitude or 90° S latitude, the cosine function equals 0. Thus, algorithm may fail to display a map of the area near 90° N latitude or 90° S latitude properly. It is important to allow a map of each area on the earth to be properly displayed with high visibility.

Under the circumstance, it is desirable to allow a map of each area on the earth properly.

According to a embodiment of the invention, there is provided a map data display control apparatus including: a position information acquiring section acquiring position information; a latitude determining section determining whether a latitude identified by the acquired position information is in the excess of a predetermined latitude threshold or not; a display range calculating section calculating a display range for displaying a map with reference to a position identified by the acquired position information based on the result of the determination made by the latitude determining section; and a rendering section rendering a map associated with the reference position based on the calculated display range. There is also provided a display control method for the apparatus and a program for executing the method on a computer. Thus, it is possible to determine whether a latitude identified from acquired position information is in the excess of a predetermined latitude threshold or not. A display range can be calculated based on the result of the determination, and a map can be rendered based on the display range thus calculated.

According to the embodiment of the invention, the display range calculating section may calculate the display range based on the latitude identified by the acquired position information and the latitude threshold when the latitude identified by the acquired position information is in the excess of the latitude threshold and may calculate the display range based on the latitude and a longitude identified by the acquired position information when the latitude identified by the acquired position information is not in the excess of the latitude threshold. Thus, when a latitude identified by acquired position information is in the excess of a latitude threshold, a display range can be calculated based on a longitude thereof and the latitude threshold. When the latitude identified by the acquired position information is not in the excess of the latitude threshold, a display range can be calculated based on the latitude and the longitude identified by the acquired position information.

The map data display control apparatus according the embodiment of the invention may further include an accepting section accepting an instructing operation for specifying the scale of a map to be displayed and a scale determining section determining whether the accepted scale of the map is in the excess of a predetermined scale threshold or not. The display range calculating section may calculate the display range based on the result of the determination made by the latitude determining section and the result of the determination made by the scale determining section. Thus, it can be determined whether the scale of a map is in the excess of a scale threshold or not, and a display range can be calculated based on the result of latitude determination and the result of the determination made by the scale determining section.

According to the embodiment of the invention, the display range calculating section may calculate the display range based on the latitude identified by the acquired position information and a predetermined value when the accepted scale of the map is not in the excess of the scale threshold. Thus, when the scale of a map is not in the excess of a scale threshold, a display range can be calculated based on a latitude identified by acquired position information and a predetermined value.

According to the embodiment of the invention, when the accepted scale of the map is in the excess of the scale threshold, the display range calculating section may calculate the display range based on a longitude identified by the acquired position information and the latitude threshold if the latitude identified by the acquired position information is in the excess of the latitude threshold and may calculate the display range based on the latitude and the longitude identified by the acquired position information if the latitude identified by the acquired position information is not in the excess of the latitude threshold. Thus, in a case wherein the scale of a map is in the excess of a scale threshold, when a latitude identified by acquired position information is in the excess of a latitude threshold, a display range can be calculated based on a longitude thereof and the latitude threshold. When the latitude identified by the acquired position information is not in the excess of the latitude threshold, a display range can be calculated based on the latitude and the longitude identified by the acquired position information.

According to the embodiment of the invention, a display control section causing a display section to display a map rendered as described above may be provided. Thus, a rendered map can be displayed on a display section.

According to the embodiment of the invention, the position information acquiring section may acquire position information based on a particular signal received from an external apparatus. Thus, position information can be acquired based on a particular signal received from an external apparatus.

According to the embodiment of the invention, the position information acquiring section may acquire position information based on an operation input which is based on an operation by a user. Thus, position information can be acquired based on an operation input which is based on an operation by a user.

According to another embodiment of the invention, there is provided a map data display control apparatus including: a position information acquiring section acquiring position information; a latitude determining section determining whether a latitude identified by the acquired position information is in the excess of a predetermined latitude threshold or not; and a display range calculating section calculating a display range for displaying a map with reference to a position identified by the acquired position information based on the result of the determination made by the latitude determining section. There is also provided a display control method for the apparatus and a program for causing a computer to execute the method. Thus, it can be determined whether a latitude identified by acquired position information is in the excess of a predetermined latitude threshold, and a display range can be calculated based on the result of the determination.

The embodiments of the invention are highly advantageous in that maps of various areas on the earth can be properly displayed.

DETAILED DESCRIPTION OF THE INVENTION

The best modes for carrying out the invention (hereinafter referred to as embodiments) will now be described. The embodiments will be described in order as shown below.

1. First Embodiment (control of map data display: an example of calculations of a display range for displaying a map)

2. Second Embodiment (control of map data display: an example of communication of map data in a communication system)<

1. First Embodiment

Exemplary Configuration of a Map Data Display Control Apparatus

Figure 1:
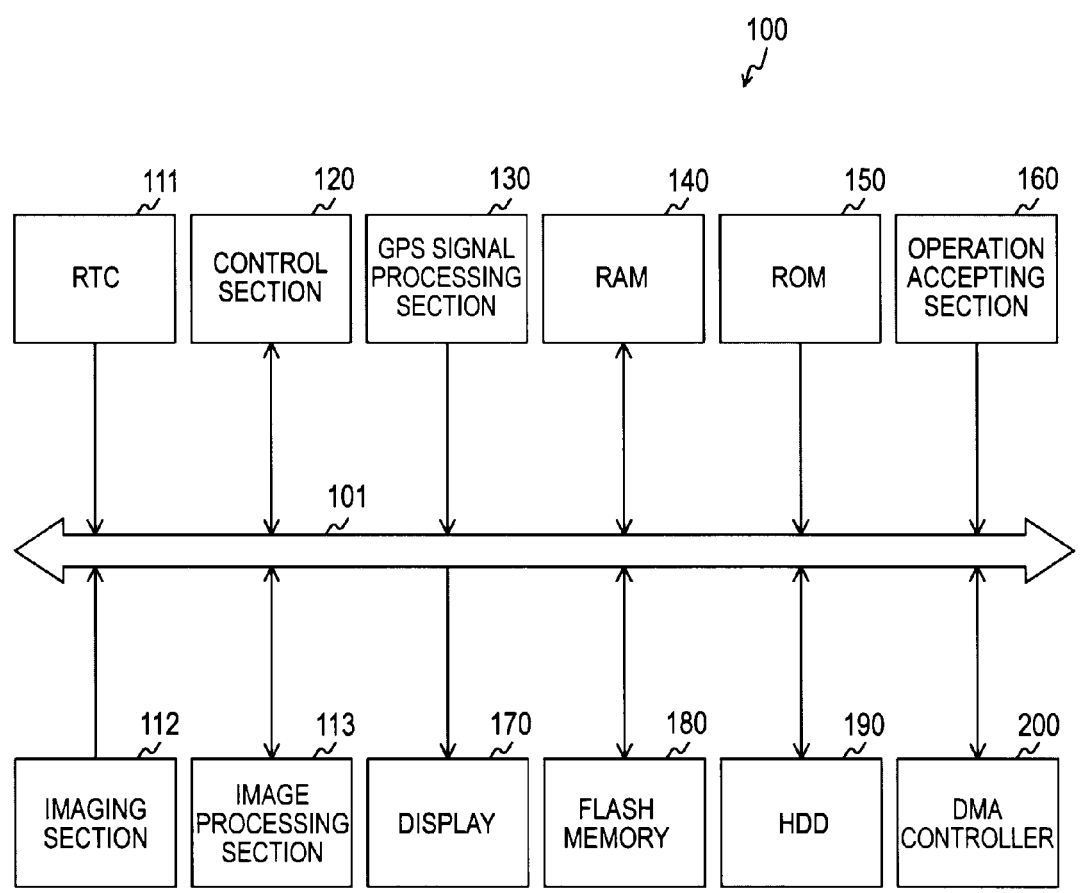
FIG. 1 is a block diagram showing an exemplary internal configuration of a map data display control apparatus 100 according to a first embodiment of the invention.

FIG. 1 is a block diagram showing an exemplary internal configuration of a map data display control apparatus 100 according to a first embodiment of the invention. The map data display control apparatus 100 includes an RTC (Real Time Clock) 111, an imaging section 112, an image processing section 113, a control section 120, and a GPS signal processing section 130. The map data display control apparatus 100 also includes a RAM (Random Access Memory) 140, a ROM (Read Only Memory) 150, an operation accepting section 160, and a display 170. The map data display control apparatus 100 further includes a flash memory 180, an HDD (Hard Disk Drive) 190, and a DMA (Direct Memory Access) controller 200. Various parts of the map data display control apparatus 100 communicate with each other through a bus 101.

The RTC 111 is a circuit exclusively used for clocking which operates on power provided from a battery incorporated in the apparatus when no power is supplied to the apparatus. The RTC 111 operates on power supplied from an external power source when the power source is on. For example, the control section 120 acquires date/time information from the RTC 111 when it is activated and performs various types of control using the date/time information.

The imaging section 112 converts incident light from an object into image data under control exercised by the control section 120, and the image data thus generated is supplied to the image processing section 113.

The image processing section 113 performs various types of image processing on the image data supplied from the imaging section 112 under control exercised by the control section 120. The image data which have been subjected to various types of image processing are supplied to the display 170 or the like. The image data are also recorded in the HDD 190 as contents.

The control section 120 controls various parts of the map data display control apparatus 100 based on various types of control programs stored in the ROM 150. The control section 120 controls various parts of the map data display control apparatus 100 based on operation inputs accepted by the operating accepting section 160.

The GPS signal processing section 130 calculates position information based on a GPS signal received by a GPS signal receiving antenna (not shown) and outputs the position information thus calculated to the control section 120. The calculated position information includes various items of position-related data such as a latitude, a longitude, and an altitude.

The RAM 140 is a memory used as a main memory of the control section 120, and it has work areas for programs executed by the control section 120.

The ROM 150 is a read-only memory in which various types of control programs are stored.

The operation accepting section 160 is a section which accepts operation content provided as a result of a user's operation and which outputs a signal according to the operation content thus accepted to the control section 120.

The display 170 is a display for displaying various types of information under control exercised by the control section 120. The display 170 displays a map associated with map data stored in the HDD 190 based on, for example, an operation input at the operation input section 160. The display section 170 also displays a map associated with map data stored in the HDD 190 based on, for example, position information calculated, by the GPS signal processing section 130. For example, a display such as an LCD (Liquid Crystal Display) may be used as the display 170. The operation accepting section 160 and the display 170 may be integrally formed as a touch panel which is touched by a finger or the like to enable various operations.

The HDD 190 is a hard disc in which various types of application programs are stored. For example, map data for displaying a map on the display 170 are stored in the HDD 190. Further, image data which have been subjected to image processing at the image processing section 113 are stored in the HDD 190 as contents.

The DMA controller 200 controls data transfers between the RAM 140, the display 170, and the HDD 190 under control exercised by the control section 120.

Figure 2:
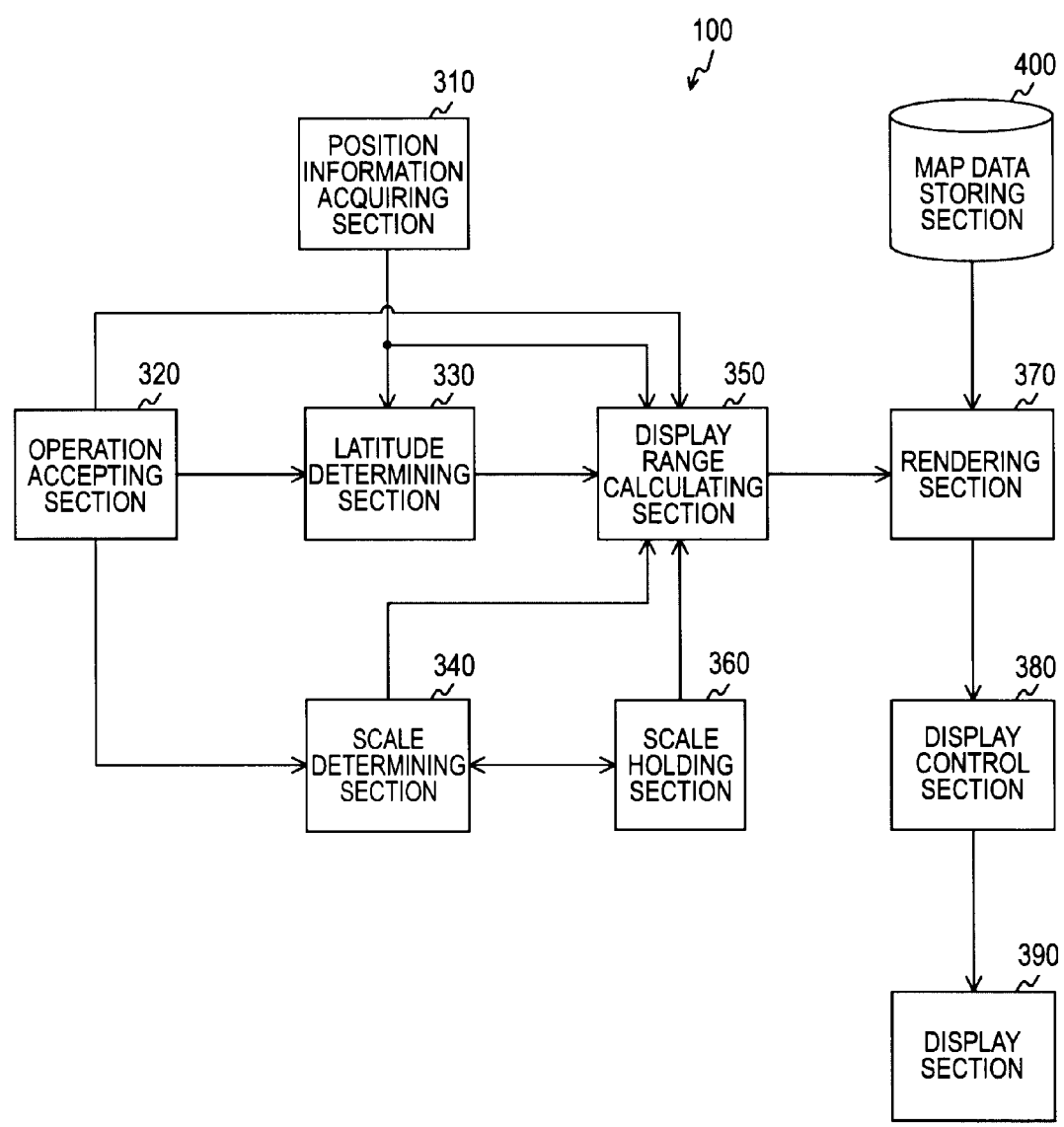
FIG. 2 is a block diagram showing an exemplary functional configuration of the map data display control apparatus 100 according to the first embodiment of the invention.

FIG. 2 is a block diagram showing an exemplary functional configuration of the map data display control apparatus 100 according to the first embodiment of the invention. The map data display control apparatus 100 includes a position information acquiring section 310, an operation accepting section 320, a latitude determining section 330, a scale determining section 340, a display range calculating section 350, a scale holding section 360, and a rendering section 370. The map data display control apparatus 100 also includes a display control section 380, a display section 390, and a map data storing section 400.

The map data storing section 400 is provided for storing map data for displaying a map on the display section 390, and the section supplies the map data stored therein to the rendering section 370. For example, the map data stored in the map data storing section 400 are items of data which are identified by latitudes and longitudes, and the map data are divided into a plurality of areas in predetermined latitudinal and longitudinal widths. For example, map data are read out from the map data storing section 400 based on the scale and center position of a map to be displayed and the latitudinal and longitudinal width associated with the map, and a map is rendered by the rendering section 370 according to the map data read out as thus described. The scale of a map to be displayed is a value indicating the ratio at which actual distances are reduced to render the map. A latitudinal width associated with a map to be displayed is a value identifying the size of the map in the latitudinal direction, and a longitudinal width associated with a map to be displayed is a value identifying the size of the map in the longitudinal direction. In the first embodiment of the invention, a display range is a rectangular range identified by such latitudinal and longitudinal widths. The map data storing section 400 corresponds to the HDD 190 shown in FIG. 1.

The position information acquiring section 310 acquires position information and outputs the acquired position information to the latitude determining section 330 and the display range calculating section 350. The position information acquiring section 310 corresponds to the GPS signal processing section 130 shown in FIG. 1.

The operation accepting section 320 is a section which accepts instructing operations for causing the display section 390 to display a map. Operation contents according to the instructing operations thus accepted are output to the scale determining section 340 and the display range calculating section 350. For example, when the section 320 accepts an instructing operation for causing the display section 390 to display a map based on position information acquired by the position information acquiring section 310, operation contents indicating such an instruction are output to the display range calculating section 350. For example, when the section 320 accepts an instructing operation for causing the display section 390 to display a map of a desired area, position information associated with the map of the desired area is output to the display range calculating section 350, and the position information is also output to the latitude determining section 330. For example, position information associated with a map of a desired area is the latitude and longitude of the center position of the map of the desired area. When section 320 accepts an instructing operation for moving a map displayed on the display section 390, position information associated with the map obtained after the movement thereof caused by the instructing operation is output to the display range calculating section 350, and the position information is also output to the latitude determining section 330. For example, the position information associated with the map obtained after the movement is the latitude and longitude of the center position of the map after the movement. When the section 320 accepts an instructing operation for specifying or changing the scale of the map displayed on the display section 390, a scale value is output to the scale determining section 340 according to the instructing operation. The operation accepting section 320 corresponds to the operation accepting section 160 shown in FIG. 1. The operation accepting section 320 is an example of the accepting section and position information acquiring section described in the summary of the invention.

The latitude determining section 330 determines whether the latitude identified by position information output from the position information acquiring section 310 or the operation accepting section 320 is in the excess of a latitude threshold or not and outputs the result of the determination to the display range calculating section 350. The latitude determining section 330 corresponds to the control section 120 shown in FIG. 1.

The scale determining section 340 determines whether a scale value of a map output from the operation accepting section 320 is in the excess of a scale threshold or not and outputs the result of the determination to the display range calculating section 350. Each time a scale value of a map is output from the operation accepting section 320, the scale determining section 340 causes the scale holding section 360 to hold the map scale value. For example, the scale threshold serving as a criterion for the determination may be 1/40000000. The scale determining section 340 corresponds to the control section 120 shown in FIG. 1.

When an instructing operation for displaying a map on the display section 390 is accepted by the operation accepting section 320, the display range calculating section 350 calculates a display range for the map to be displayed and outputs the calculated display range to the rendering section 370. Specifically, the display range calculating section 350 calculates a display range based on a map scale value held by the scale holding section 360 and position information output from the position information acquiring section 310 or the operation accepting section 320. At this time, the display range calculated has a latitude value which has been changed based on a determination result output from the latitude determining section 330 and a determination result output from the scale determining section 340. For example, the display range calculating section 350 calculates a display range based on a longitude and a predetermined value included in position information output as described above when it is determined by the scale determining section 340 that scale value of the map held in the scale holding section 360 is not in the excess of the scale threshold. The predetermined value may be, for example, 0 (°). For example, when it is determined by the latitude determining section 330 that a latitude identified by the output position information is in the excess of the latitude threshold, the display range calculating section 350 calculates a display range based on the longitude included in the position information and the latitude threshold. A method of calculating a display range will be described in detail with reference to FIGS. 5A and 5B. The display range calculating section 350 corresponds to the control section 120 shown in FIG. 1.

The scale holding section 360 holds a scale value of a map to be used for the calculation of a display range carried out by the display range calculating section 350. The section supplies the map scale value held therein to the display range calculating section 350. The map scale value held in the scale holding section 360 is sequentially updated each time an instructing operation is performed to specify a different map scale or to change the scale value.

The rendering section 370 renders an image associated with map data stored in the map data storing section 400 based on a display range output from the display range calculating section 350. The rendering section 370 corresponds to the DMA controller 200 shown in FIG. 1.

The display control section 380 causes the display section 390 to display a map rendered by the rendering section 370. The display control section 380 corresponds to the control section 120 shown in FIG. 1.

The display section 390 displays a map rendered by the rendering section 370. The display section 390 corresponds to the display 170 shown in FIG. 1.

[Example of Calculation of Display Range]

Figure 3:
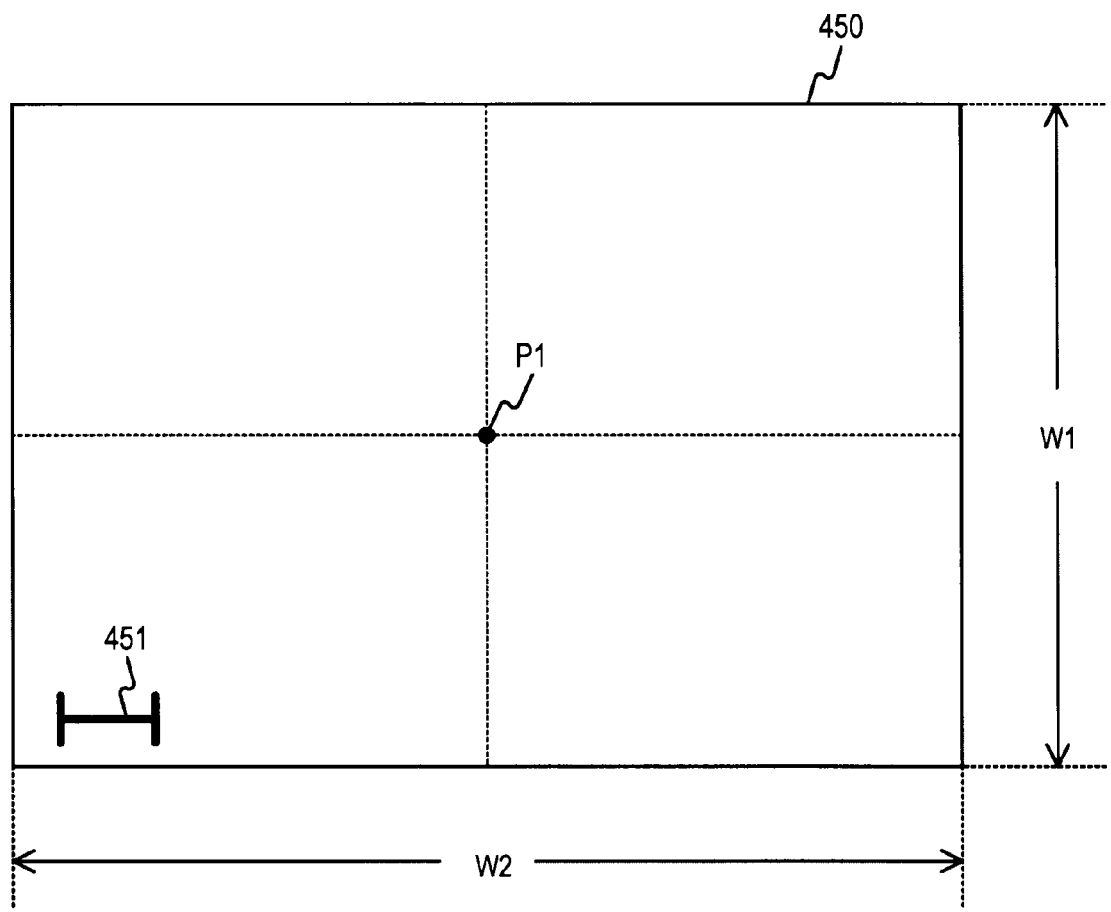
FIG. 3 is an illustration showing an example of a screen displayed on a display section 390 of the first embodiment of the invention.

FIG. 3 is an illustration showing an example of a display screen 450 of the display section 390 according to the first embodiment of the invention. The display screen 450 shown in FIG. 3 is a screen having 320 pixels in the vertical direction and 640 pixels in the horizontal direction. A map of each area is displayed on the display screen 450 based on map data stored in the map data storing section 400. A map displayed on the display screen 450 can be enlarged or reduced by a map scale specifying (changing) operation performed by a user. No map is shown in FIG. 3 for convenience.

For example, let us assume that a reference position P1 is a position defined with reference to a latitude and a longitude identified by position information output from the position information acquiring section 310 or the operation accepting section 320. For example, the reference position P1 is a center position of the display screen 450. A display range is calculated by the display range calculating section 350 based on a map scale value held in the scale holding section 360 and position information output from the position information acquiring section 310 or the operation accepting section 320. For example, the display range corresponds to a vertical length W1 and a horizontal length W2 of the display screen 450 which has a rectangular shape. A method of calculating such a display range will be described with reference to FIGS. 5A and 5B.

A scale bar 451 is superimposed on a map displayed on the display screen 450. The scale bar 451 represents the scale of the map displayed on the display screen 450. For example, let us assume that the horizontal length of the scale bar 451 is a length equivalent to 64 pixels of the display screen 450. In this case, for example, when the horizontal length of the scale bar 451 represents 1 km, the vertical length W1 and the horizontal length W2 of the display screen 450 represent 5 km and 10 km, respectively.

Figure 4A:
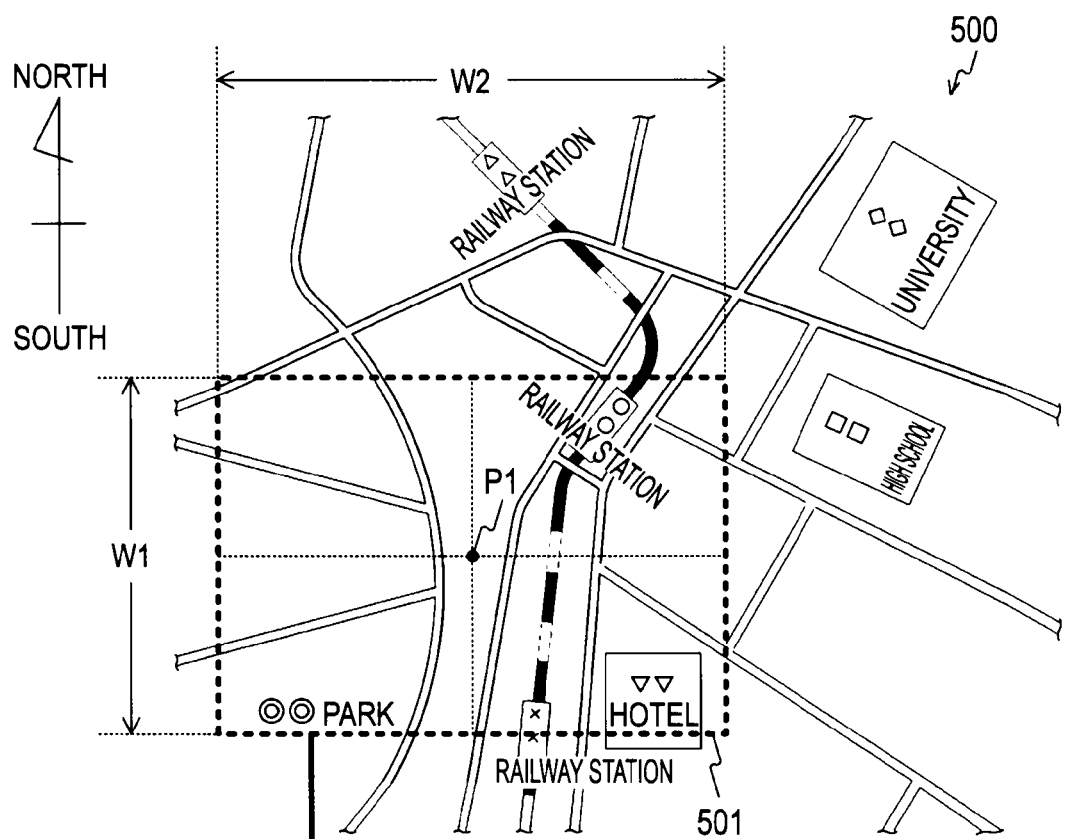
FIGS. 4A and 4B are illustrations schematically showing a part of map data stored in a map data storing section 400 of the first embodiment of the invention.
Figure 4B:
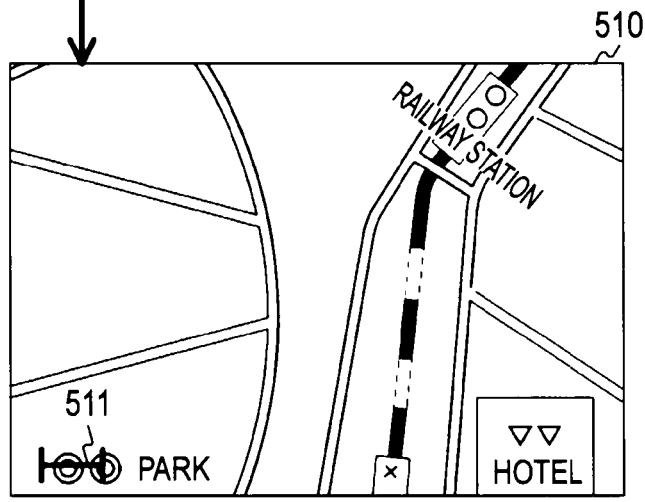

FIGS. 4A and 4B are illustrations which schematically represent a part of map data stored in the map data storing section 400 according to the first embodiment of the invention. A map 500 shown in FIG. 4A is a map representing an area associated with a part of the map data stored in the map data storing section 400. The top side of the map 500 represents the north. For example, a railway station AA, another railway station BB, still another station CC, a park DD, a university EE, a high-school FF, and a hotel GG are located in the area corresponding to the map 500. In this example, an area included in a display range 501 of the map 500 is displayed on the display section 390.

For example, let us assume that a reference position P1 is a position defined with reference to a latitude and a longitude identified by position information output from the position information acquiring section 310 or the operation accepting section 320. The display range calculating section 350 calculates a display range based on a scale value of a map held in the scale holding section 360 and position information output from the position information acquiring section 310 or the operation accepting section 320. Subsequently, the rendering section 370 acquires map data from the map data storing section 400 based on the display range thus calculated and renders a map of an area included in a display range 501 based on the map data thus acquired. As shown in FIG. 4B, the display control section 380 subsequently causes the display section 390 to display the map 510 of the area included in the display range 501 rendered by the rendering section 370. A scale bar 511 is superimposed on the map 510 displayed on the display section 390.

Referring to user operations such as displaying a map, for example, a cursor may be displayed on the display section 390, and a user can use the cursor to perform operations for instructing such operations. For example, an operation of instructing a map movement may be performed by using the cursor to point a position at which a map is to be centered after it is moved. The display section 390 may be formed as a touch panel, and instructing operations as thus described may be performed in accordance with operations of depressing the touch panel. For example, an operation of instructing a map movement may be performed by depressing the position in a position at which a map is to be centered after it is moved.

Figure 5A:
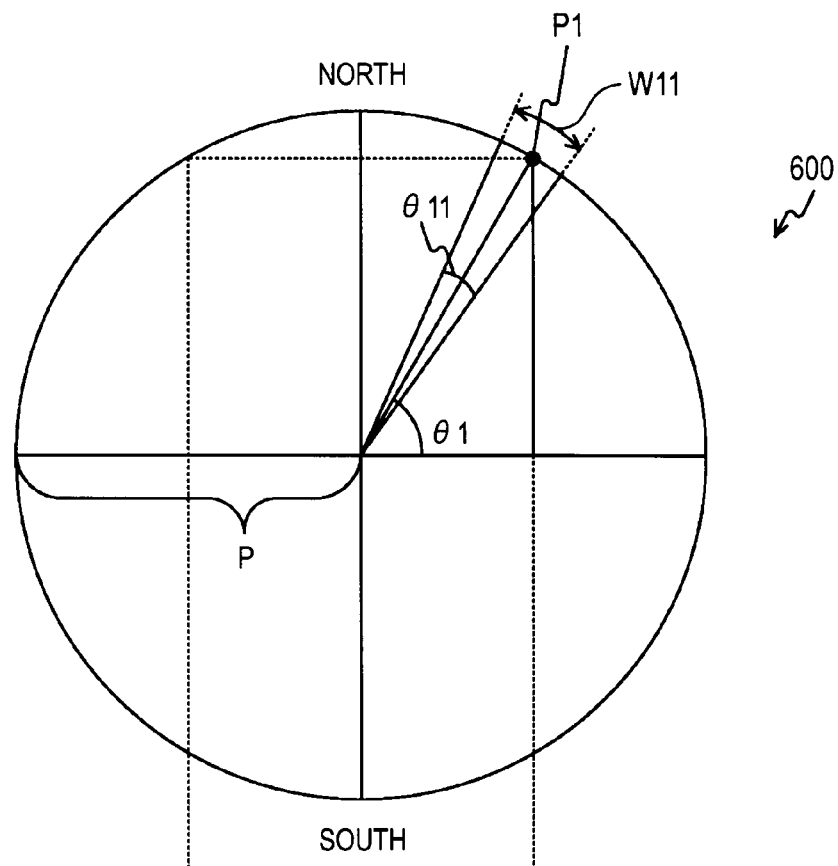
FIGS. 5A and 5B are illustrations schematically showing the earth serving as a reference for the calculation of a display range carried out a display range calculating section 350 of the first embodiment of the invention.
Figure 5B:
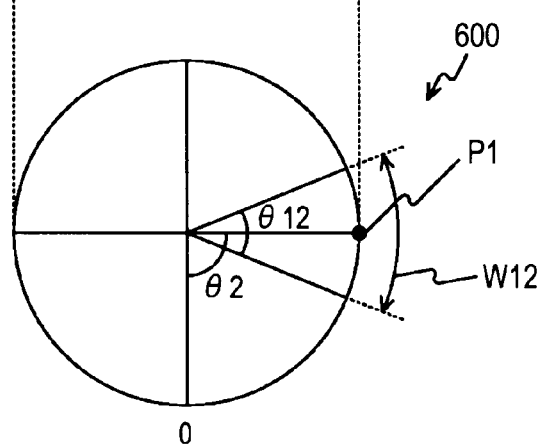

FIGS. 5A and 5B are schematic illustrations showing how the earth serves as a reference for the calculation of a display range carried out by the display range calculating section 350 according to the first embodiment of the invention. In FIG. 5A, the earth (which is designated by reference numeral 600) is represented by a section thereof passing through the axis thereof. In FIG. 5B, the earth 600 is represented by a section thereof passing through a plane which is in parallel with a plane including the equator (a section passing trough a position P1 shown in FIG. 5A). The lower part of the axis extending in the earth 600 in the vertical direction of FIG. 5B represents 0° latitude.

An example will now be described, in which a display range is calculated based on a reference position P1 which is a position defined with reference to a latitude and a longitude identified by position information output from the position information acquiring section 310 or the operation accepting section 320. It is assumed that the latitude and the longitude associated with the reference position P1 are represented by θ1 and θ2, respectively. It is also assumed that a distance in the vertical direction of a map displayed on a display screen identified by a map scale value held in the scale holding section 360 is represented by S. Specifically, a distance represented by a length in the vertical direction of the display screen 450 shown in FIG. 3 corresponds to the distance S, and a distance represented by a length in the horizontal direction of the display screen corresponds to a distance 2S.

As shown in FIG. 5A, for example, an angle θ11 identifying a latitudinal size (latitudinal width) W11 of a display range is calculated using Expression 1 shown below.

$$\text{Angle } \theta 11 = (S \cdot 360°)/2\pi R \qquad \text{Expression 1}$$

R represents a constant representing the length of the radius of the earth. Therefore, 2πR represents the length of the circumference of the earth. As will be apparent from the above, the angle θ11 is calculated regardless of the latitude and the longitude of the reference position P1.

As shown in FIG. 5B, for example, an angle θ12 identifying a longitudinal size (longitudinal width) W12 of a display range is calculated using Expression 2 shown below.

$$\text{Angle } \theta 12 = (2S \cdot 360°)/2\pi R \cos \theta 1 \qquad \text{Expression 2}$$

R and 2πR represent values similar to those in Expression 1, and θ1 represents the latitude of the reference position P1. As will be apparent from the above, the angle θ12 may be calculated at different values depending on the latitude of the reference position even if there is no change in the latitude of the position.

As thus described, the display range calculating section 350 calculates the angle θ11 and the angle θ12 based on the latitude θ1 identified by the reference position P1 and the distance identified by a map scale held in the scale holding section 360. Subsequently, the display range calculating section 350 calculates a display range (W11×W12) whose center is the reference position P1 using the angle θ11 and the angle θ12 thus calculated. For example, the latitudinal width W11 of the display range is identified as a range from (θ−θ11/2) to (θ+θ11/2). The longitudinal width W12 of the display range is identified as a range from (θ2−θ12/2) to (θ2+θ12/2).

An example of calculation of a display range using specific numerical values will now be described. For example, let us assume that the latitude θ1 of the reference position P1 is 60°; the longitude θ2 of the reference position is 0°; and the distance is 5 km. In this example, a distance is shown in kilometers, and it is assumed that the length 2πR of the circumference of the earth is 40,000 (km) for simplicity of description.

In this case, the angle θ11 is calculated as (5×360)/40000=0.045(°). Since cos 60°=½, the angle θ12 is calculated as (2×5×360)/(40000×½)=0.18(°).

Based on those values, the latitudinal width W11 of the display range is calculated as a range from 59.9775 to 60.0225 (=(60−0.045/2) to (60+0.0452)). The longitudinal width W12 of the display range is calculated as a range from −0.09 to +0.09 (=(0−0.18/2) to (0+0.18/2)). Map data to be acquired from the map data storing section 400 are calculated based on the latitudinal width W11 and the longitudinal width W12 calculated as thus described. A map is rendered based on map data acquired according to the result of the calculation.

[Example of Change in Calculation of Display Range According to Latitude of Reference Position]

For example, let us assume that the map data display control apparatus 100 is excellent in low temperature resistance. In such a case, the owner of a map data display control apparatus 100 may use the apparatus in an area near 90° N latitude or 90° latitude. Further, when a user operates a map data display control apparatus 100 to display a map, a map of an area near 90° N latitude or 90° latitude may be displayed. In such cases, the angle θ11 can be calculated using Expression 1, because the angle is calculated regardless of the latitude and the longitude of the reference position P1. However, the value of the angle θ12 calculated using Expression 2 may vary depending on the latitude of the reference position P1. A cosine function is included in the denominator of Expression 2 and, for example, cos 90°=0 at 90° N latitude. Then, the denominator becomes zero, and the angle θ12 is therefore infinity. Thus, the algorithm fails. For this reason, when a map is displayed using the polar region at 90° N latitude or 90° latitude as the reference position P1, it is assumed that the map will not be displayed properly. The value of the angle θ12 is greater, the higher the latitude. Therefore, the value of the angle θ12 becomes extremely large, for example, in an area near 90° N latitude or 90° latitude. For this reason, when a moving map is displayed in an area near 90° N latitude or 90° latitude, significant changes occur to reduce the visibility in the map that is associated with a reference position as the map moves even if the amount of movement is small. A landform on the map can significantly change as if it is squeezed, and the visibility of the landform can therefore be reduced.

On the Northern Hemisphere, there is no habited island beyond a latitudinal limit at about 83°. Habited areas in Alaska and Norway are substantially limited to a northern limit at about 70°. Thus, an extremely small number of people live in areas near 90° N latitude. In such an area, it is more important to render a map associated with a reference position accurately according to actual distances in order to keep the visibility of the map high enough by suppressing significant changes in the map which can occur as the map moves.

Under the circumstance, according to the first embodiment of the invention, when the latitude of the reference position of a map to be displayed is in the excess of a latitude threshold, the display range is calculated using the latitude threshold.

Figure 6:
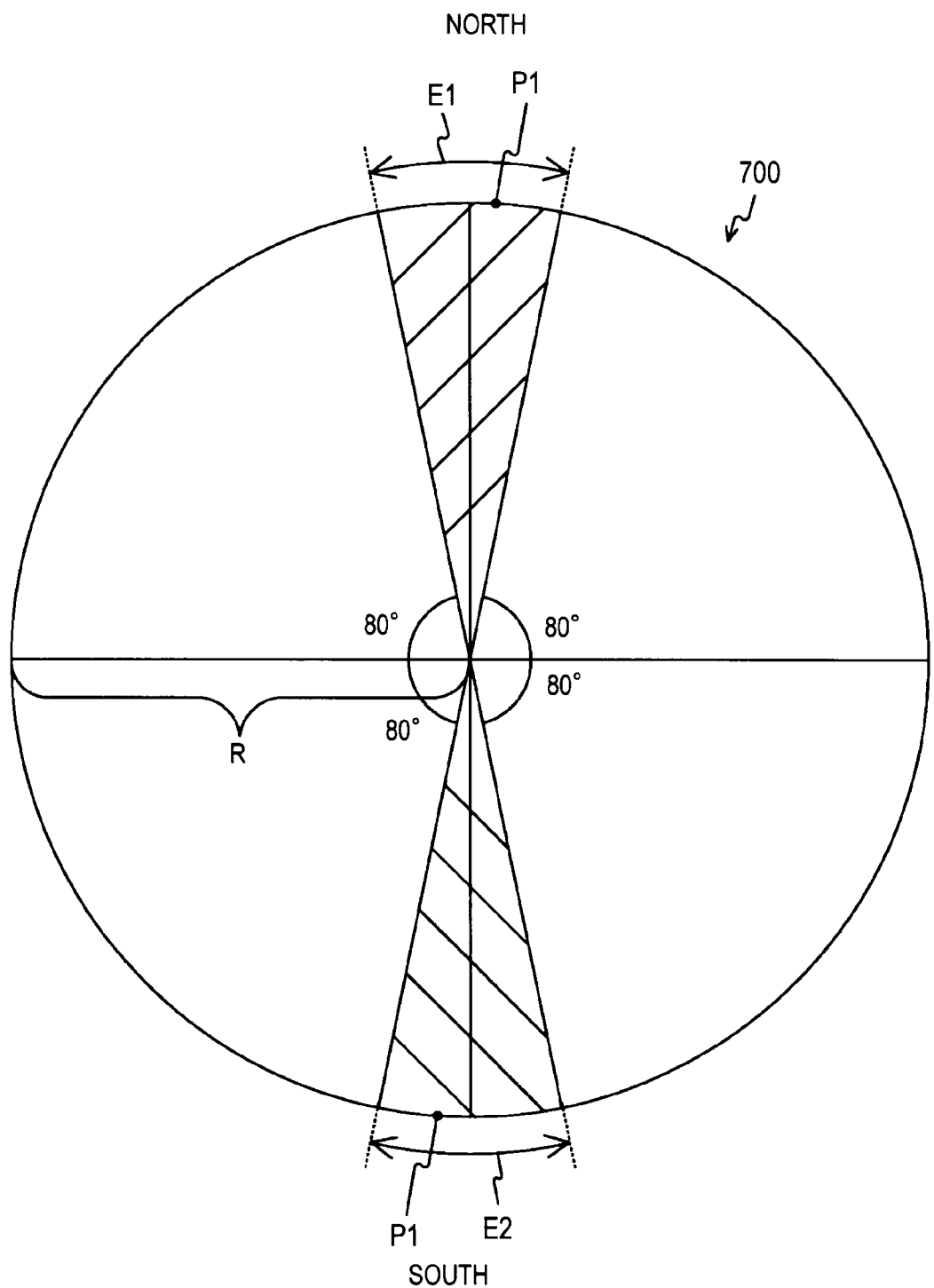
FIG. 6 is an illustration schematically showing a latitude determination method used by a latitude determining section 330 of the first embodiment of the invention.

FIG. 6 is an illustration schematically showing a method of determining a latitude carried out by the latitude determining section 330 according to the first embodiment of the invention. In FIG. 6, the earth (which is designated by reference numeral 700) is represented by a section passing through the earth axis. In the section of the earth 700, the range of 80° and higher N latitudes and the range of 80° and higher latitudes are indicated by oblique lines. A region E1 at 80° and higher N latitudes and a region E2 at 80° and higher latitudes on the earth are regions having a circular shape.

As shown in FIG. 6, for example, when a reference position P1 is included in either the region E1 at 80° and higher N latitudes or the region E2 at 80° and higher latitudes, the latitude determining section 330 determines that the reference position P1 is in the excess of a latitude threshold (80°). When the result of the determination is output to the display range calculating section 350, the display range calculating section 350 calculates the angle θ12 using the latitude value of 80°. Specifically, the angle θ12 is calculated using Expression 3 shown below.

$$\text{Angle } \theta 12 = (2S \cdot 360°)/2\pi R \cos 80° \qquad \text{Expression 3}$$

An example of calculation of a display range will now be described using specific numeral values. For example, let us assume that the latitude θ1 and the longitude θ2 of the reference position P1 are 85° and 0°, respectively and that the distance is 5 km. In this example, a distance is shown in kilometers, and it is assumed that the length 2πR of the circumference of the earth is 40,000 km.

In this case, since the latitude of the reference position P1 is in the excess of the latitude threshold (80°), the angle θ12 is calculated using Expression 3. Let us now assume that cos 80° is 0.1736 for simplicity of description. Then, the angle θ12 is calculated as (2×5×360)/(40000×cos 80°)≈0.52(°).

Subsequent calculations according to the calculation method will not be described because they are similar to those described above.

As thus described, when a reference position P1 is included in either the region E1 at 80° and higher N latitudes or the region E2 at 80° and higher latitudes, the display range is calculated using Expression 3. When a reference position P1 is included in neither the region E1 at 80° and higher N latitudes nor the region E2 at 80° and higher latitudes, the display range is calculated using Expression 2. While the latitude threshold used in this example is 80°, the latitude threshold may be appropriately changed depending on the size of the location of interest where an extremely small number of people live. The latitude threshold may alternatively be set by an operation performed by a user. A value different from the latitude threshold may alternatively be used for the calculation of the display range. For example, the value used for the calculation of the display range may be 80 when the latitude threshold is 85°.

As a result, for example, even when the owner of a map data display control apparatus 100 brings the apparatus to an area near 90° N latitude or 90° latitude to use it in the area, a map of the area can be properly displayed. Even when the map data display control apparatus 100 is operated by a user to display a map of an area near 90° N latitude or 90° latitude without bringing the apparatus to the area, a map of the area can be properly displayed. Further, when a moving map is displayed in an area near 90° N latitude or 90° latitude, the map can be displayed with high visibility by suppressing changes in the map, which is associated with a reference position, occurring when the map moves.

[Example of Change in Calculation of Display Range According to Scale Value]

A description has been made above on an example in which a latitude value used for calculating a display range is changed depending on whether a reference position is in the excess of a latitude threshold or not. For example, let us now assume that a moving map is displayed with a relatively small scale (or a wide display range). In such a case, since the display range is wide, even when a reference position is set at a latitude that is not so high, a map associated with the reference position can undergo significant changes as it moves, and the visibility of the map can therefore be reduced. That is, a landform on the map associated with the reference position can significantly change as if it is squeezed as the map moves, which can result in a reduction of the visibility of the map.

Under the circumstance, according to the first embodiment of the invention, a display range is calculated using a predetermined value (e.g., 0°), for example, when a map scale value which has been specified (or changed) by an operation of a user is not in the excess of a scale threshold.

Figure 7A:
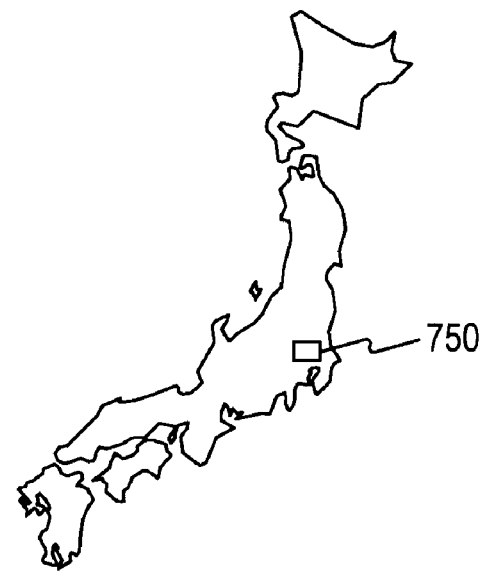
FIGS. 7A and 7B are illustrations schematically showing a scale determination method used by a scale determining section 340 of the first embodiment of the invention.
Figure 7A:
Figure 7B:
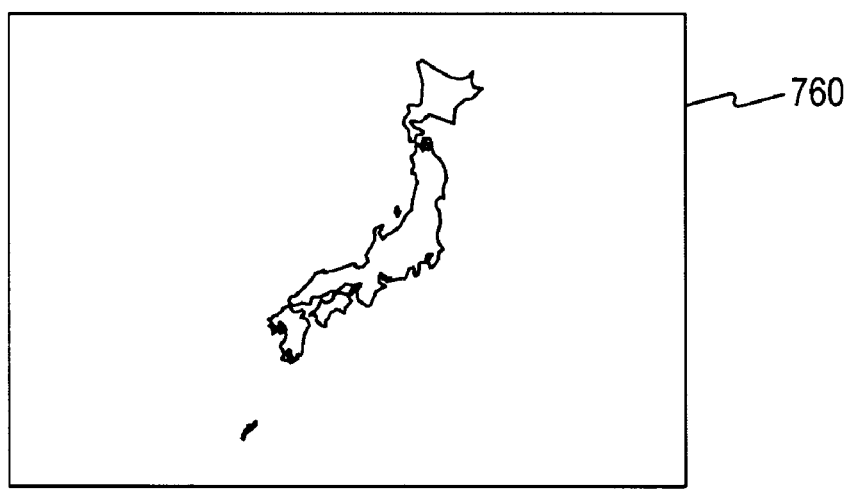

FIGS. 7A and 7B are illustrations schematically showing a scale determination method used by the scale determining section 340 according to the first embodiment of the invention. FIGS. 7A and 7B show maps of Japan in a simplified form. FIG. 7A shows a display range 750 set on a map of Japan having a relatively great scale (or displaying more details). FIG. 7B shows a display range 760 set on a map of Japan having a relatively small scale (displaying a wider range).

When a scale which has been specified (or changed) by a user's operation is in the excess of a scale threshold (e.g., 1/40000000) as shown in FIG. 7A the scale determining section 340 determines that the scale is in the excess of the threshold scale. When the result of the determination is output to the display range calculating section 350, the display range calculating section 350 calculates the angle θ12 using the latitude θ1 of a reference position. That is, the angle θ12 is calculated using Expression 2.

When a scale which has been specified (or changed) by a user's operation is not in the excess of a scale threshold (e.g., 1/40000000) as shown in FIG. 7B the scale determining section 340 determines that the scale is not in the excess of the threshold scale. When the result of the determination is output to the display range calculating section 350, the display range calculating section 350 calculates the angle θ12 using a latitude value of 0°. That is, the angle θ12 is calculated using Expression 4 shown below.

$$\text{Angle } \theta 12 = (2S360°)/2\pi R \cos 0° \qquad \text{Expression 4}$$

As thus described, when a scale which has been specified (or changed) by a user's operation is not in the excess of a scale threshold, a display range is calculated using Expression 4. While a scale of 1/40000000 is used as a scale threshold in this example, a different value may alternatively be used. While a latitude value of 0° is used when it is determined that a scale threshold is not exceeded by way of example, a different value (e.g., 10° or small latitude) may be used. A scale threshold and a latitude value may alternatively be set by a user's operation.

As a result, for example, when a moving map is displayed with its scale specified at a relatively small value, the map can be displayed with high visibility by suppressing changes as it moves in the map, which is associated with a reference position, occurring when the map moves. Specifically, when a map having a relatively small scale is displayed, the latitude value used for calculating a display range may be set at 0°. Thus, the map can be displayed with high visibility by preventing significant distortional changes from occurring in the display of the map each time the map moves.

[Examples of Operations of Map Data Display Control Apparatus]

Operations of the map data display control apparatus 100 according to the first embodiment of the invention will now be described with reference to the drawings.

Figure 8:
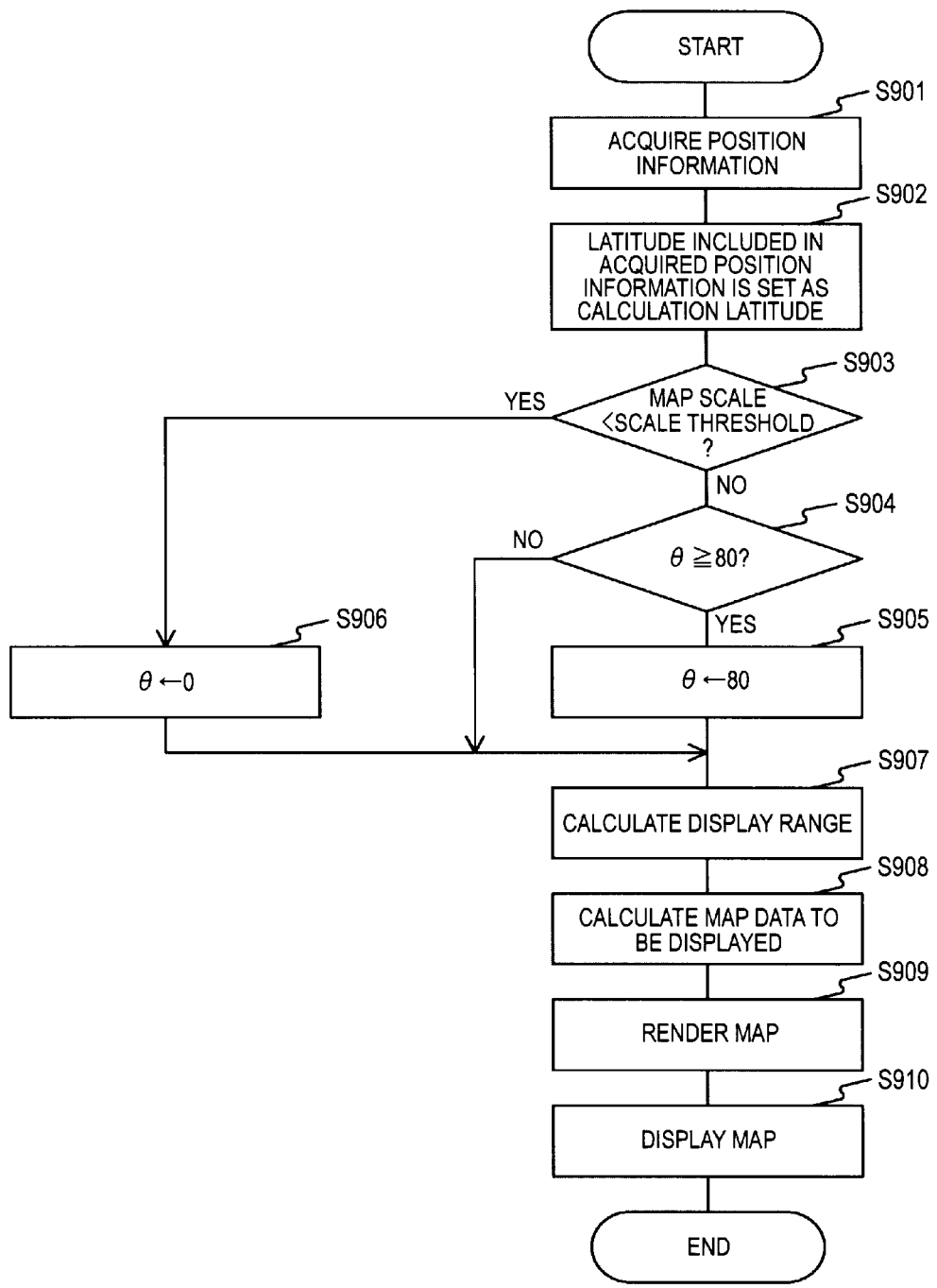
FIG. 8 is a flow chart showing steps of a map data display control process performed by the map data display control apparatus 100 according to the first embodiment of the invention.
Figure 9:
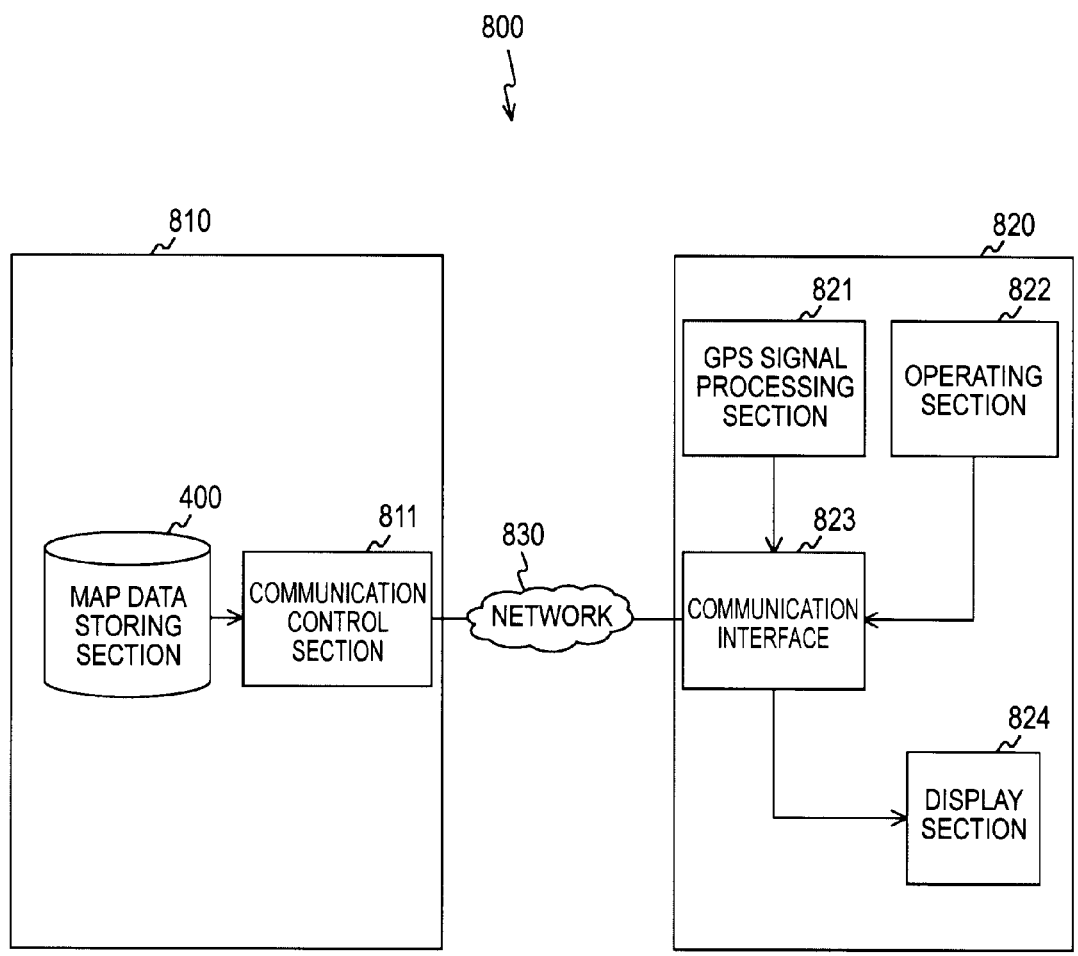
FIG. 9 is a block diagram showing an exemplary system configuration of a map data communication system 800 according to a second embodiment of the invention.

FIG. 8 is a flow chart showing steps of a map data display control process performed by the map data control apparatus 100 according to the first embodiment of the invention. The description will address an example in which each time position information is acquired by the position information acquiring section 310, a map is displayed based on the acquired position information. It is assumed that the scale of a map is specified by a user's operation.

First, the position information acquiring section 310 acquires position information (step S901). Step S901 is an example of the position information acquiring step described in the summary of the invention. Next, a latitude value included in the acquired position information is set as a calculation latitude θ to be used for calculating a display range (step S902). Next, the scale determining section 340 determines whether the scale value held in the scale holding section 360 is in the excess of a scale threshold (step S903) or not. When the operation accepting section 320 has accepted an instructing operation for specifying a new scale value, it is determined whether the new scale value is in the excess of the scale threshold or not.

When the scale value held in the scale holding section 360 is in the excess of the scale threshold (step S903), the latitude determining section 330 determines whether the latitude included in the position information acquired by the position information acquiring section 310 is equal to or greater than a latitude threshold (step S904). For example, it is determined whether the latitude included in the acquired position information is equal to or greater than 80°. Step S904 is an example of the latitude determination step described in the summary of the invention. When the latitude included in the position information acquired by the position information acquiring section 310 is equal to or greater than the latitude threshold (S904), the display range calculating section 350 sets the calculation latitude θ at 80(°) (step S905). When the latitude included in the position information acquired by the position information acquiring section 310 is smaller than the latitude threshold (step S904), the process proceeds to step S907.

When the scale value held in the scale holding section 360 is not in the excess of the scale threshold (step S903), the display range calculating section 350 sets the calculation latitude θ at 0(°) (step S906).

Next, the display range calculating section 350 calculates a display range using the scale value held in the scale holding section 360, the calculation latitude θ, and the latitude included in the position information acquired by the position information acquiring section 310 (step S907). Step S907 is an example of the display range calculating step described in the summary of the invention. Next, map data required for rendering a map are calculated using the display range thus calculated (step S908). The rendering section 370 acquires map data stored in the map data storing section 400 using the display range and the calculation result, and the section renders a map based on the map data (step S909). Step S909 is an example of the rendering step described in the summary of the invention. Next, the display control section 380 causes the display section 390 to display the map thus rendered (step S910).

In the above-described example, a map is displayed based on position information acquired by the position information acquiring section 310. The description similarly applies also when an operation instructing display or movement of a map is accepted by the operation accepting section 320. For example, when an operation instructing display or movement of a map is accepted by the operation accepting section 320 at step S901, step S902 and the subsequent processing steps may be executed using position information associated with the instructing operation.

The first embodiment of the invention has been described as an example in which a map is moved such that the map is centered at a reference position identified by position information calculated by the GPS signal processing section 130 after the map is moved. The process may alternatively be performed using position information acquired by other methods for acquiring position information. For example, the process may be performed using position information derived from access point information of a radio LAN (Local Area Network) existing in the neighborhood of the position of interest. The first embodiment of the invention has been described as an example in which a map may be moved such that the map is centered at a position identified by an operation of instructing display or movement of the map accepted by the operation accepting section 320 after the map is moved. Alternatively, an operation of instructing display or movement of a map performed on an external device (e.g., a remote controller) may be received and accepted through a radio network or wired network.

2. Second Embodiment

Exemplary Configuration of Map Data Communication System

The first embodiment of the invention has been exemplified by an instance in which a map is displayed on the display 170 provided on the map data display control apparatus 100. The first embodiment of the invention can be used in a situation in which a map is to be displayed on an external display. A map data communication system for displaying a map on an external display will now be described as a second embodiment of the invention with reference to the drawings.

FIG. 8 is a block diagram showing an exemplary system configuration of a map data communication system 800 according to the second embodiment of the invention. The map data communication system 800 includes a map data display control apparatus 810 and a display 820. The map data display control apparatus 810 is connected to the display 820 through a network 830. The map data display control apparatus 810 is a version of the map data display control apparatus 100 of the first embodiment of the invention which is partially modified to provide a communication control section 811. The display 820 includes a GPS signal processing section 821, an operating section 822, a communication interface 823, and a display section 824.

The communication control section 811 controls communication carried out between the apparatus 810 and the display 820 through the network 830. For example, the communication control section 811 outputs map data stored in the map data storing section 400 to the communication interface 823 according to an operation of instructing display or movement of a map performed on the operating section 822 to display a map associated with the map data on the display section 824. Alternatively, the communication control section 811 may output map data stored in the map data storing section 400 to the communication interface 823 according to position information acquired by the GPS signal processing section 821 to display a map associated with the map data on the display section 824. For example, data output from the rendering section 370 shown in FIG. 2 may be output to the communication interface 823 to display the data on the display section 824. Features of the map data display control apparatus 810 are substantially identical to the features of the map data display control apparatus 100 except the communication control section 811. Therefore, those identical features are omitted in the illustration and description.

The embodiments of the invention may be applied to imaging apparatus such as digital video cameras and portable telephones capable of rendering a map.

The above-described embodiments of the invention exemplify modes for carrying out the invention, and the embodiments have correspondence to the items described in the summary of the invention. The invention is not limited to those embodiments, and various modifications may be made without departing from the spirit of the invention.

Referring to the processing steps involved in the above-described embodiments of the invention, it may be understood that those steps are implemented in the form of a method involving the series of steps, a program for causing a computer to execute the series of steps, or a recording medium having such a program stored therein. For example, a CD (Compact Disc), an MD (MiniDisc), a DVD (Digital Versatile Disc), a memory card, or a Blu-ray Disc (registered trademark) may be used as such a recording medium.

The present application contains subject matter related to that disclosed in Japanese Priority Patent Application JP 2008-330544 filed in the Japan Patent Office on Dec. 25, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A map data display control apparatus comprising:
a position information acquiring section acquiring position information;
a latitude determining section determining whether a latitude identified by the acquired position information is in an excess of a predetermined latitude threshold or not;
a display range calculating section calculating a display range for displaying a map with reference to a position identified by the acquired position information based on a result of the determining by the latitude determining section; and
a rendering section rendering a map associated with the reference position based on the calculated display range, wherein
the display range calculating section calculates the display range based on the latitude identified by the acquired position information and the latitude threshold when the latitude identified by the acquired position information is in the excess of the latitude threshold, and
the display range calculating section calculates the display range based on the latitude and a longitude identified by the acquired position information when the latitude identified by the acquired position information is not in the excess of the latitude threshold.

2. A map data display control apparatus according to claim 1, further comprising:
an accepting section accepting an instructing operation for specifying the scale of a map to be displayed; and
a scale determining section determining whether the accepted scale of the map is in the excess of a predetermined scale threshold or not, wherein
the display range calculating section calculates the display range based on the result of the determination made by the latitude determining section and the result of the determination made by the scale determining section.

3. A map data display control apparatus according to claim 2, wherein the display range calculating section calculates the display range based on the latitude identified by the acquired position information and a predetermined value when the accepted scale of the map is not in the excess of the scale threshold.

4. A map data display control apparatus according to claim 3, wherein when the accepted scale of the map is in the excess of the scale threshold, the display range calculating section calculates the display range based on a longitude identified by the acquired position information and the latitude threshold if the latitude identified by the acquired position information is in the excess of the latitude threshold and calculates the display range based on the latitude and the longitude identified by the acquired position information if the latitude identified by the acquired position information is not in the excess of the latitude threshold.

5. A map data display control apparatus according to claim 1, further comprising a display control section causing a display section to display the rendered map.

6. A map data display control apparatus according to claim 1, wherein the position information acquiring section acquires position information based on a particular signal received from an external apparatus.

7. A map data display control apparatus according to claim 1, wherein the position information acquiring section acquires position information based on an operation input which is based on an operation by a user.

8. A map data display control apparatus comprising:
a position information acquiring section acquiring position information;
a latitude determining section determining whether a latitude identified by the acquired position information is in an excess of a predetermined latitude threshold or not; and
a display range calculating section calculating a display range for displaying a map with reference to a position identified by the acquired position information based on a result of the determining by the latitude determining section, wherein
the display range calculating section calculates the display range based on the latitude identified by the acquired position information and the latitude threshold when the latitude identified by the acquired position information is in the excess of the latitude threshold, and
the display range calculating section calculates the display range based on the latitude and a longitude identified by the acquired position information when the latitude identified by the acquired position information is not in the excess of the latitude threshold.

9. A map data display control method comprising the steps of:
acquiring position information;
determining whether a latitude identified by the acquired position information is in an excess of a predetermined latitude threshold or not;
calculating a display range for displaying a map with reference to a position identified by the acquired position information based on a result of the determining step; and
rendering a map associated with the reference position based on the calculated display range, wherein
the calculating the display range includes calculating the display range based on the latitude identified by the acquiring position information and the latitude threshold when the latitude identified by the acquiring position information is in the excess of the latitude threshold, and
the calculating the display range includes calculating the display range based on the latitude identified by the acquiring position information and a longitude identified by the acquiring position information when the latitude identified by the acquiring position information is not in the excess of the latitude threshold.

10. A non-transitory computer readable medium including an executable program, that when executed by a computer, causes the computer to execute the steps of:
acquiring position information;
determining whether a latitude identified by the acquired position information is in an excess of a predetermined latitude threshold or not;
calculating a display range for displaying a map with reference to a position identified by the acquired position information based on a result of the determining step; and
rendering a map associated with the reference position based on the calculated display range, wherein
the calculating the display range includes calculating the display range based on the latitude identified by the acquiring position information and the latitude threshold when the latitude identified by the acquiring position information is in the excess of the latitude threshold, and
the calculating the display range includes calculating the display range based on the latitude identified by the acquiring position information and a longitude identified by the acquiring position information when the latitude identified by the acquiring position information is not in the excess of the latitude threshold.

* * * * *